United States Patent
Stahl et al.

(10) Patent No.: US 10,464,370 B2
(45) Date of Patent: Nov. 5, 2019

(54) WHEEL BEARING UNIT

(71) Applicant: Schaeffler Technologies AG & Co. KG, Herzogenaurach (DE)

(72) Inventors: Matthias Stahl, Schweinfurt (DE); Natalie Treubert, Röthlein (DE); Frank Eichelmann, Donnersdorf (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/770,229

(22) PCT Filed: Sep. 2, 2016

(86) PCT No.: PCT/DE2016/200412
§ 371 (c)(1),
(2) Date: Apr. 23, 2018

(87) PCT Pub. No.: WO2017/076403
PCT Pub. Date: May 11, 2017

(65) Prior Publication Data
US 2018/0244101 A1 Aug. 30, 2018

(30) Foreign Application Priority Data

Nov. 2, 2015 (DE) .......... 10 2015 014 059
Jan. 21, 2016 (DE) .......... 10 2016 200 774

(51) Int. Cl.
*F16C 13/00* (2006.01)
*B60B 27/00* (2006.01)
(Continued)

(52) U.S. Cl.
CPC .......... *B60B 27/0005* (2013.01); *B60B 27/00* (2013.01); *B60B 27/0073* (2013.01); *F16C 19/185* (2013.01); *F16C 19/522* (2013.01); *F16C 35/067* (2013.01); *F16C 39/02* (2013.01); *B60B 27/06* (2013.01); *B60B 2380/12* (2013.01);
(Continued)

(58) Field of Classification Search
CPC .. F16C 19/186; F16C 35/067; F16C 2326/02; B60B 27/0005; B60B 27/001; B60B 27/0094
See application file for complete search history.

(56) References Cited

U.S. PATENT DOCUMENTS 4,789,252 A 12/1988 Dreschmann et al.
2005/0018939 A1* 1/2005 Niwa ............... B60B 27/00
384/544
(Continued)

FOREIGN PATENT DOCUMENTS

DE 4017764 A1 12/1991
DE 10060638 A1 8/2001
(Continued)

*Primary Examiner* — Phillip A Johnson
(74) *Attorney, Agent, or Firm* — Antun M. Peakovic

(57) ABSTRACT

Wheel bearing units are disclosed. In one example, a wheel bearing unit includes an outer ring element and an inner ring element, between which there are arranged at least two rolling body rows. The inner ring element may have a radial flange which is fastenable to an axle body or to a wheel. The radial flange and/or the inner ring element may have at least one projection on a surface facing toward the outer ring element.

3 Claims, 1 Drawing Sheet

(51) Int. Cl.
  *F16C 39/02*    (2006.01)
  *F16C 19/52*    (2006.01)
  *F16C 19/18*    (2006.01)
  *F16C 35/067*   (2006.01)
  *B60B 27/06*    (2006.01)
  *F16C 33/76*    (2006.01)

(52) U.S. Cl.
  CPC ....... *B60B 2380/73* (2013.01); *B60B 2380/90* (2013.01); *B60B 2900/212* (2013.01); *B60B 2900/321* (2013.01); *B60B 2900/511* (2013.01); *B60B 2900/711* (2013.01); *B60B 2900/721* (2013.01); *F16C 19/186* (2013.01); *F16C 33/767* (2013.01); *F16C 2326/02* (2013.01)

(56) References Cited

U.S. PATENT DOCUMENTS

| | | |
|---|---|---|
| 2010/0254643 A1 | 10/2010 | Komori |
| 2011/0135233 A1 | 6/2011 | Sutherlin et al. |
| 2011/0243487 A1 | 10/2011 | Sutherlin |

FOREIGN PATENT DOCUMENTS

| | | | |
|---|---|---|---|
| DE | 102011083097 A1 | 3/2013 | |
| EP | 2184181 B1 | 5/2010 | |
| JP | 2006010055 A | 1/2006 | |
| JP | 2007271055 A | 10/2007 | |
| WO | WO-2011152536 A1 * | 12/2011 | ......... B60B 27/0005 |

* cited by examiner

WHEEL BEARING UNIT

CROSS-REFERENCE TO RELATED APPLICATIONS

This application is the U.S. National Phase of PCT Appln. No. PCT/DE2016/200412 filed Sep. 2, 2016, which claims priority to DE 102015014059.0 filed Nov. 2, 2015 and to DE 102016200774.2 filed Jan. 21, 2016, the entire disclosures of which are incorporated by reference herein.

TECHNICAL FIELD

The disclosure relates to a wheel bearing unit, in particular for motor vehicles.

BACKGROUND

Wheel bearings are composed of an outer ring and of a wheel bearing hub and of rolling bodies arranged in-between. The wheel bearing hub has a radially outwardly directed wheel flange to which, for example, a wheel can be fastened. In certain driving situations, for example when driving over a pothole or against a curbstone, axial and/or radial shocks act on the wheel flange and/or on the wheel bearing hub. Said shocks have the effect that the wheel flange/wheel bearing hub moves in the direction of, and strikes, an outer ring of the wheel bearing unit. The forces that arise in the process are then introduced into the rolling bearing.

EP 2 184 181 B1 has disclosed a wheel bearing unit which has a wheel hub with a wheel flange. A rolling bearing is arranged between an outer ring and the wheel hub. In the described wheel bearing unit, damage to the rolling bearing owing to a lateral shock is avoided by a certain gap width.

SUMMARY

The disclosure is based on the object of providing a wheel bearing unit which reduces the damage to the rolling bearing in the event of a shock acting on the wheel bearing unit and which furthermore ensures reliable sealing of the bearing.

According to the disclosure, said object is achieved by a wheel bearing unit having an outer ring element and having an inner ring element, between which there are arranged at least two rolling body rows, wherein the inner ring element has a radial flange which is fastenable to an axle body or to a wheel, wherein the radial flange and/or the inner ring element has at least one projection on a surface facing toward the outer ring element.

The disclosure is based on the realization that, in certain driving situations, for example when driving over a pothole or against a curbstone, axial and/or radial shocks act on the wheel bearing unit. Said shocks have the effect that the inner ring element and/or the radial flange make contact with the outer ring element. In the wheel bearing unit according to the disclosure, the radial flange and/or the inner ring element has at least one projection on a surface facing toward the outer ring element. Said projection is designed such that, in the event of an axial or radial shock of the inner ring element and/or radial flange, said projection absorbs the force that acts as a result, and dissipates said force in order to prevent damage to the rolling bearing and/or to the raceways. By contrast to the prior art, such a construction may entail higher manufacturing costs, but said construction leads overall to an increase of the service life of the wheel bearing unit.

The surface of the radial flange and/or of the inner ring element may have one or more projections which are arranged so as to be distributed over the circumference. Furthermore, the disclosure may relate to a wheel bearing unit with a row or multiple rows of rolling bodies in an X or O arrangement. Here, the rolling bodies may be formed with equal or different diameters and/or of a different rolling bearing type.

The at least one projection on the surface is preferably formed as a ring segment. This means that the at least one projection extends in the circumferential direction not over the entire surface. If multiple projections are provided, these are provided on the surface so as to be distributed in the circumferential direction. This has the advantage that the one or more projections may be provided in a manner dependent on the embodiment of the wheel bearing unit, the available structural space and the requirements.

In one refinement of the disclosure, the at least one projection is formed integrally on the radial flange and/or on the inner ring element, that is to say in one piece. In this way, it is possible to produce the radial flange and the inner ring element, respectively, together with projection in one manufacturing step. In the case of this refinement, a further connection of the projection to the radial flange and to the inner ring element, respectively, can be omitted.

In one refinement of the disclosure, the at least one projection is formed as a separate element. Here, the separate element may be attached directly or indirectly to the surface of the radial flange and/or of the inner ring element. The separate element may for example be formed from a forged part. The separate element may also be formed from some other metallic or non-metallic material.

The separate element is preferably connected in non-positively locking, positively locking, or cohesive fashion to the radial flange and/or the inner ring element. It is thereby ensured that the separate element remains in a fixed position throughout the usage duration. The type of connection is dependent on the embodiment of the separate element, that is to say for example material, shape etc.

In an alternative refinement of the disclosure, the at least one projection has a coating. The coating may serve for reducing generated noises.

BRIEF DESCRIPTION OF THE DRAWINGS

Embodiments of the disclosure will be presented below on the basis of two figures. In the figures.

DETAILED DESCRIPTION

Figure 1:
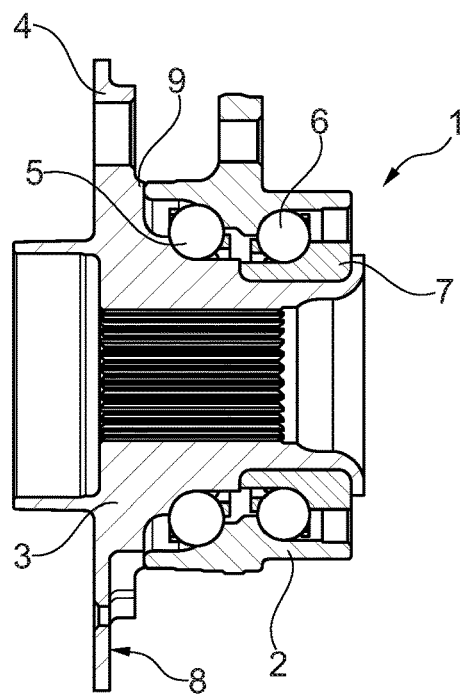
FIG. 1 shows a longitudinal section through a wheel bearing unit according to the disclosure.

FIG. 1 shows a wheel bearing unit 1 according to one embodiment, which wheel bearing unit is assigned to a vehicle wheel (not illustrated). The wheel bearing unit 1 comprises an outer ring element 2 and an inner ring element 3. The inner ring element 3 has a radial flange 4, which is fastenable to a wheel or axle body (not illustrated in any more detail). Furthermore, the wheel bearing arrangement has two axially spaced-apart rolling body rows 5, 6, the rolling bodies of which are guided at the outside in the outer ring element 2. At the inside, the rolling bodies of the rolling body row 5 are guided directly in a raceway of the inner ring element 3, and the rolling bodies of the rolling body row 6 are guided in an inner ring 7 fixed to the inner ring element 3.

Figure 2:
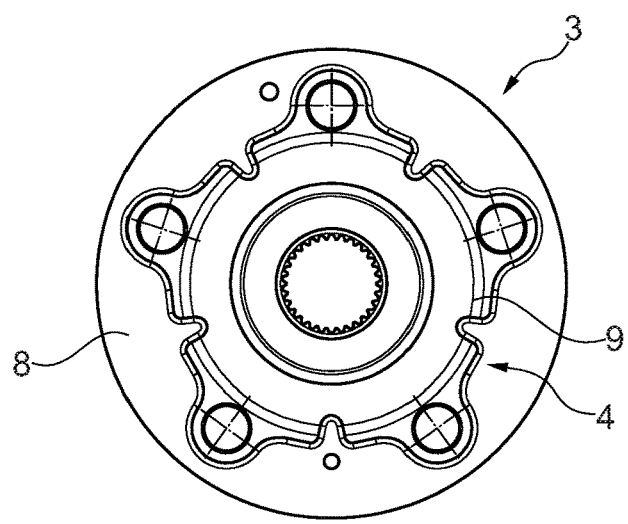
FIG. 2 is an illustration of an outer ring element of the wheel bearing unit shown in FIG. 1.

For the more detailed explanation of a first embodiment, reference is made below to FIG. 2. A surface 8, which faces toward the outer ring element 2, of the inner ring element 3 and of the radial flange 4, respectively, has at least one projection 9. As can be seen in FIG. 2, the face surface 8 has a projection 9 which is formed as a ring segment. Here, the projection 9 is formed integrally, that is to say in one piece, on the inner ring element 3 and the radial flange 4, respectively.

In certain driving situations, for example when driving over a pothole or against a curbstone, axial and/or radial shocks may act on the wheel bearing unit. Said shocks have the effect that the inner ring element 3 and/or the radial flange 4 make contact with the outer ring element 2. The projection 9 provided in the wheel bearing unit 1 according to the disclosure is designed such that, in the event of an axial or radial shock of the inner ring element 3 and/or radial flange 4, said projection absorbs the force that acts as a result, and dissipates said force in order to prevent damage to the rolling bearing and/or to the raceways. Here, in the event of an axial or radial shock, contact is made only with the projection 9. The disclosure is however not restricted to a single projection 9.

LIST OF REFERENCE DESIGNATIONS

1. Wheel bearing unit
2. Outer ring element
3. Inner ring element
4. Radial flange
5. Rolling body row
6. Rolling body row
7. Inner ring
8. Surface
9. Projection

The invention claimed is:

1. A wheel bearing unit comprising:
   an outer ring element and an inner ring element, between which there are arranged at least two rolling body rows;
   wherein the inner ring element has a radial flange which is fastenable to an axle body or to a wheel;
   wherein the radial flange and/or the inner ring element has at least one projection on a surface facing toward the outer ring element; and
   wherein the at least one projection has a coating.

2. The wheel bearing unit as claimed in claim 1, wherein the at least one projection on the surface is formed as a ring segment.

3. The wheel bearing unit as claimed in claim 1, wherein the at least one projection is formed integrally on the radial flange and/or on the inner ring element.

\* \* \* \* \*